United States Patent
Hiramoto et al.

(10) Patent No.: US 10,364,756 B2
(45) Date of Patent: Jul. 30, 2019

(54) INTAKE AIR CONTROL DEVICE

(71) Applicant: DENSO CORPORATION, Kariya, Aichi-pref. (JP)

(72) Inventors: Satoru Hiramoto, Kariya (JP); Osamu Shimane, Kariya (JP); Ju Hwan Bae, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/763,287

(22) PCT Filed: Sep. 7, 2016

(86) PCT No.: PCT/JP2016/076240
§ 371 (c)(1),
(2) Date: Mar. 26, 2018

(87) PCT Pub. No.: WO2017/056883
PCT Pub. Date: Apr. 6, 2017

(65) Prior Publication Data
US 2018/0274452 A1 Sep. 27, 2018

(30) Foreign Application Priority Data
Oct. 2, 2015 (JP) ................................. 2015-197147

(51) Int. Cl.
*F02D 9/10* (2006.01)
*F16K 1/22* (2006.01)

(52) U.S. Cl.
CPC ............... *F02D 9/107* (2013.01); *F02D 9/10* (2013.01); *F02D 9/1005* (2013.01); *F02D 9/106* (2013.01); *F16K 1/224* (2013.01); *Y02T 10/42* (2013.01)

(58) Field of Classification Search
CPC ........ F02D 9/107; F02D 9/106; F02D 9/1005; F02D 9/10; F16K 1/224; Y02T 10/42
(Continued)

(56) References Cited

U.S. PATENT DOCUMENTS 4,880,207 A * 11/1989 Matsumoto ............... F02D 9/02
251/337
5,492,097 A * 2/1996 Byram ...................... F02D 9/02
123/396

(Continued)

FOREIGN PATENT DOCUMENTS

JP       62-129538      6/1987
JP       1-249931      10/1989
(Continued)

*Primary Examiner* — John Bastianelli
(74) *Attorney, Agent, or Firm* — Nixon & Vanderhye P.C.

(57) ABSTRACT

A fixing shaft portion of a valve shaft is fixed to a throttle valve at first and second locations by first and second fixing members. A first bearing includes an inner race fixed to a first rotatable shaft portion of the valve shaft, and an outer race fixed to a valve body. A second bearing includes a slidable portion axially slidably fitted to a second rotatable shaft portion of the valve shaft and a fixing portion fixed to the valve body. A linear expansion coefficient of the throttle valve and a linear expansion coefficient of the valve body are set to be larger than a linear expansion coefficient of the valve shaft in an axial direction. A first distance measured from a center point of the throttle valve to the first location is larger than a second distance measured from the center point to the second location.

5 Claims, 8 Drawing Sheets

(58) Field of Classification Search
USPC .................................. 123/337; 251/305–308
See application file for complete search history.

(56) References Cited

U.S. PATENT DOCUMENTS

| | | | | |
|---|---|---|---|---|
| 5,685,521 | A * | 11/1997 | Yoshida | F02D 9/1065 123/400 |
| 5,687,691 | A * | 11/1997 | Kaiser | F02D 9/106 123/337 |
| 6,565,067 | B1 * | 5/2003 | Nanba | F02D 9/101 123/337 |
| 6,766,580 | B2 * | 7/2004 | Nanba | F02D 9/101 29/407.09 |
| 7,950,623 | B2 * | 5/2011 | Sasaki | F02D 41/0077 251/129.04 |
| 8,864,384 | B2 * | 10/2014 | Ohba | F16C 33/7856 384/482 |
| 2002/0189584 | A1 * | 12/2002 | Tanaka | F02D 11/10 123/399 |
| 2003/0111628 | A1 | 6/2003 | Nanba et al. | |
| 2015/0267656 | A1 * | 9/2015 | Hasegawa | F02B 27/0252 123/184.59 |

FOREIGN PATENT DOCUMENTS

| | | |
|---|---|---|
| JP | 2011-231625 | 11/2011 |
| JP | 2013-044313 | 3/2013 |
| JP | 2013-253490 | 12/2013 |

* cited by examiner

| ELEMENT | LINEAR EXPANSION COEFFICIENT IN AXIAL DIRECTION | RELATIONSHIP OF LINEAR EXPANSION COEFFICIENTS |
|---|---|---|
| VALVE SHAFT | $\alpha a$ | $\alpha a < \alpha b < \alpha c$ |
| VALVE BODY | $\alpha b$ | |
| THROTTLE VALVE | $\alpha c$ | |

INTAKE AIR CONTROL DEVICE

CROSS REFERENCE TO RELATED APPLICATION

This application is the U.S. national phase of International Application No. PCT/JP2016/076240 filed Sep. 7, 2016, which designated the U.S. and claims priority to Japanese Patent Application No. 2015-197147 filed on Oct. 2, 2015, the entire contents of each of which are hereby incorporated by reference.

TECHNICAL FIELD

The present disclosure relates to an intake air control device that controls a flow of intake air in an intake air passage of an internal combustion engine.

BACKGROUND ART

Previously, an intake air control device, which opens and closes an intake air passage formed in a valve body by rotating a throttle valve received in the intake air passage, is widely used.

In a device, which is disclosed in the patent literature 1 as one such intake air control device, a valve shaft is fixed to the throttle valve at two axial locations by a pair of fixing members. With this fixing structure, rotatable shaft portions of the valve shaft, which respectively project from two opposite axial sides of the throttle valve, are rotatably supported by two separate bearings, respectively, which are held by the valve body. Among these two bearings, a first bearing, which rotatably supports the rotatable shaft portion located on one side, includes an inner race, which is fixed to the rotatable shaft portion located on the one side, and an outer race, which is fixed to the valve body. Furthermore, among the two bearings, a second bearing, which rotatably supports the rotatable shaft portion located on the other side, includes an inner race, which is axially slidably fitted to the rotatable shaft portion located on the other side, and an outer race, which is fixed to the valve body.

In the intake air control device disclosed in the patent literature 1, an aluminum-based material is used as a material of the valve body and the throttle valve, and an iron-based material is used as a material of the valve shaft. In this case, generally, a linear expansion coefficient of the throttle valve and a linear expansion coefficient of the valve body are larger than a linear expansion coefficient of the valve shaft in the axial direction. Therefore, the valve shaft, which is axially slidable at the second bearing side that is opposite from the first bearing having the inner race fixed to the valve shaft, will have relative displacement relative to the valve body due to a thermal expansion coefficient difference. Therefore, a recess for relieving the relative displacement around at least the shaft portion of the valve shaft located on the second bearing side is formed at an axial rim section of the throttle valve. In this way, even when the relative displacement of the valve shaft is generated, interference between the throttle valve and the valve body is limited, and thereby characteristics as of the intake air control device can be ensured.

However, when the recess is formed at the throttle valve like in the disclosure of the patent literature 1, the intake air leaks through the recess even in the state where the throttle valve is fully closed. Therefore, at this time, the intake air flows through the intake air passage while the flow amount of this intake air in the intake air passage exceeds an inevitable flow amount of the intake air that inevitably flows through a full closing state clearance that is a clearance formed between the throttle valve in the full closing state and the valve body (hereinafter also simply referred to as a full closing state clearance). Thus, it is difficult to ensure the intended characteristics as of the intake air control device.

CITATION LIST

Patent Literature

PATENT LITERATURE 1: JPH01-249931A

SUMMARY OF INVENTION

The present disclosure is made in view of the above disadvantage, and it is an objective of the present disclosure to ensure characteristics as of an intake air control device.

Hereinafter, a technical means for achieving the objective will be described.

In order to achieve the above objective, according to the present disclosure, there is provided an intake air control device that controls a flow of intake air in an intake air passage of an internal combustion engine, the intake air control device including:

a throttle valve that opens and closes the intake air passage through rotation of the throttle valve;

a valve shaft that includes:

a first rotatable shaft portion and a second rotatable shaft portion, which project from one side and another side, respectively, of the throttle valve in an axial direction; and a fixing shaft portion that joins between the first rotatable shaft portion and the second rotatable shaft portion in the axial direction, wherein the fixing shaft portion is integrally rotatably fixed to the throttle valve;

a first fixing member that fixes the fixing shaft portion to the throttle valve at a first location, which is located on one side of a center point of the throttle valve where the first rotatable shaft portion is placed in the axial direction;

a second fixing member that fixes the fixing shaft portion to the throttle valve at a second location, which is located on another side of the center point of the throttle valve where the second rotatable shaft portion is placed in the axial direction;

a valve body that forms the intake air passage, which receives the throttle valve;

a first bearing that is held by the valve body and rotatably supports the first rotatable shaft portion; and a second bearing that is held by the valve body and rotatably supports the second rotatable shaft portion, wherein:

the first bearing includes an inner race, which is fixed to the first rotatable shaft portion, and an outer race, which is fixed to the valve body;

the second bearing includes a slidable portion, which is axially slidably fitted to the second rotatable shaft portion, and a fixing portion, which is fixed to the valve body;

a linear expansion coefficient of the throttle valve and a linear expansion coefficient of the valve body are set to be larger than a linear expansion coefficient of the valve shaft in the axial direction; and a first distance, which is measured from the center point to the first location in the axial direction, is set to be larger than a second distance, which is measured from the center point to the second location in the axial direction.

As recited above, the linear expansion coefficient of the throttle valve and the linear expansion coefficient of the valve body are set to be larger than the linear expansion coefficient of the valve shaft in the axial direction. Therefore, in order to limit an interference between the throttle valve and the valve body, a thermal deformation amount difference, which corresponds to a linear expansion coefficient difference between the throttle valve and the valve shaft, and a thermal deformation amount difference, which corresponds to a linear expansion coefficient difference between the valve body and the valve shaft, need to be considered.

Specifically, in the above described structure, the first rotatable shaft portion of the valve shaft is fixed to the inner race of the first bearing that has the outer race fixed to the valve body, so that the first rotatable shaft portion is rotatably supported by the first bearing. Therefore, in order to limit the interference between the throttle valve and the valve body by ensuring the full closing state clearance on the first rotatable shaft portion side, a sum of the thermal expansion amount difference between the throttle valve and the valve shaft and the thermal expansion amount difference between the valve body and the valve shaft needs to be made small at the high temperature.

Furthermore, in the above structure, the second rotatable shaft portion of the valve shaft is axially slidably fitted to the slidable portion of the second bearing that has the fixing portion fixed to the valve body, so that the second rotatable shaft portion is rotatably supported by the second bearing. Therefore, in order to limit the interference between the throttle valve and the valve body by ensuring the full closing state clearance on the second rotatable shaft portion side, a thermal contraction amount difference (a thermal deformation amount difference) between the throttle valve and the valve shaft needs to be larger than a thermal contraction amount difference (a thermal deformation amount difference) between the valve body and the valve shaft at the low temperature.

The fixing shaft portion of the valve shaft of the above structure is fixed to the throttle valve by the first fixing member at the first location that is located on the first rotatable shaft portion side of the axial center point of the throttle valve. The fixing shaft portion of the valve shaft is fixed to the throttle valve by the second fixing member at the second location that is located on the second rotatable shaft portion side of the axial center point of the throttle valve. In the above-described fixing structure, the first distance, which is measured from the center point of the throttle valve to the first location in the axial direction, is set to be larger than the second distance, which is measured from the center point of the throttle valve to the second location in the axial direction, based on the above-described finding about the thermal expansion amount difference and the thermal contraction amount difference.

With the above-described settings of the first and second distances, the first location, at which the first distance measured from the center point of the throttle valve to the first location is set to be relatively large, is relatively close to a rim section of the throttle valve located on the first rotatable shaft portion side in the axial direction. Therefore, an axial distance, which is measured from the first location to the rim section on the first rotatable shaft portion side, becomes relatively small, and thereby the thermal expansion amount difference between the throttle valve and the valve shaft can be reduced in this range, which is from the first location to the rim section on the first rotatable shaft portion side, at the high temperature. Thus, at the first rotatable shaft portion side, the sum of the thermal expansion amount difference between the throttle valve and the valve shaft and the thermal expansion amount difference between the valve body and the valve shaft can be reduced, and thereby the interference between the throttle valve and the valve body can be limited by ensuring a full closing state clearance between the throttle valve and the valve body.

With the above-described settings of the first and second distances, the second location, at which the second distance measured from the center point of the throttle valve to the second location is set to be relatively small, is relatively far from a rim section of the throttle valve located on the second rotatable shaft portion side in the axial direction. Therefore, the axial distance, which is measured from the second location to the rim section on the second rotatable shaft portion side, becomes relatively large, and thereby the thermal contraction amount difference between the throttle valve and the valve shaft can be increased in this range, which is from the second location to the rim section on the second rotatable shaft portion side, at the low temperature. Thus, at the second rotatable shaft portion side, the thermal contraction amount difference between the throttle valve and the valve shaft at the low temperature can be increased in comparison to the thermal contraction amount difference between the valve body and the valve shaft at the low temperature, and thereby the interference between the throttle valve and the valve body can be limited by ensuring the full closing state clearance.

According to the above structure of the present disclosure discussed above, it is possible to avoid the flow of the intake air through the intake air passage at the full closing time of the throttle valve beyond the inevitable flow amount of the intake air that inevitably flows through the full closing state clearance that is set to limit the interference between the throttle valve and the valve body. Therefore, it is possible to ensure the characteristics as of the intake air control device.

In the above-described structure, the linear expansion coefficient of the throttle valve in the axial direction may be set to be larger than the linear expansion coefficient of the valve body in the axial direction.

The linear expansion coefficient of the throttle valve is set to be larger than the linear expansion coefficient of the valve body in the axial direction, so that the thermal expansion amount difference between the throttle valve and the valve shaft can easily become larger than the thermal expansion amount difference between the valve body and the valve shaft. However, at the throttle valve, the axial distance, which is measured from the first location to the rim section on the first rotatable shaft portion side, becomes relatively small according to the settings of the first and second distances, so that the thermal expansion amount difference between the throttle valve and the valve shaft can be minimized in this range, which is from the first location to the rim section on the first rotatable shaft portion side, at the high temperature. In this way, at the first rotatable shaft portion side, with respect to the thermal expansion amount difference between the valve body and the valve shaft and the thermal expansion amount difference between the throttle valve and the valve shaft, which can easily become larger that the thermal expansion amount difference between the valve body and the valve shaft, the sum of these thermal expansion amount differences can be reduced at the high temperature, and thereby the interference between the throttle valve and the valve body can be limited.

DESCRIPTION OF EMBODIMENTS

Hereinafter, various embodiments of the present disclosure will be described with reference to the accompanying drawings. In the following respective embodiments, similar structural elements are indicated by the same reference signs and may not be redundantly described. In a case where only a part of a structure is described in each of the following embodiments, the rest of the structure of the embodiment may be the same as that of previously described one or more of the embodiments. Besides the explicitly described combination(s) of structural components in each of the following embodiments, the structural components of different embodiments may be partially combined even though such a combination(s) is not explicitly described as long as there is no problem.

(First Embodiment)

Figure 1:
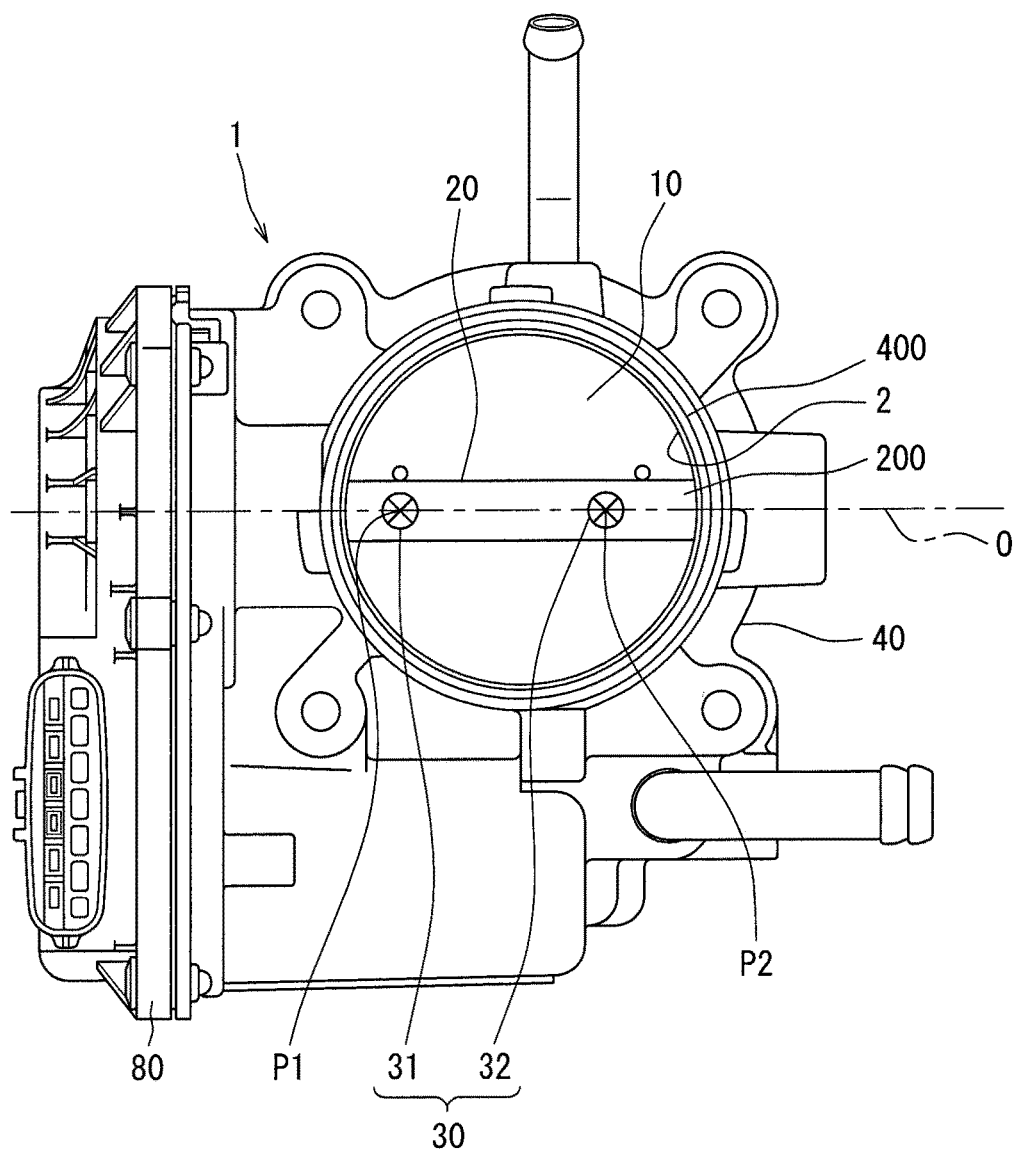
FIG. 1 is a front view of an intake air control device according to a first embodiment.
Figure 2:
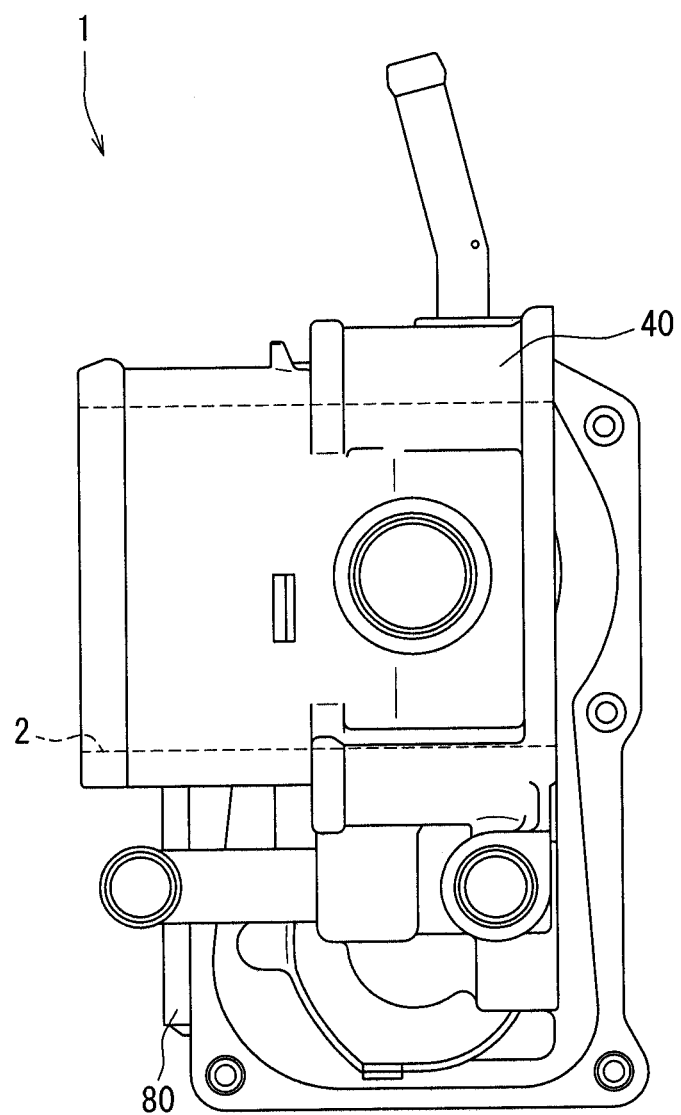
FIG. 2 is a side view of the intake air control device according to the first embodiment.
Figure 3:
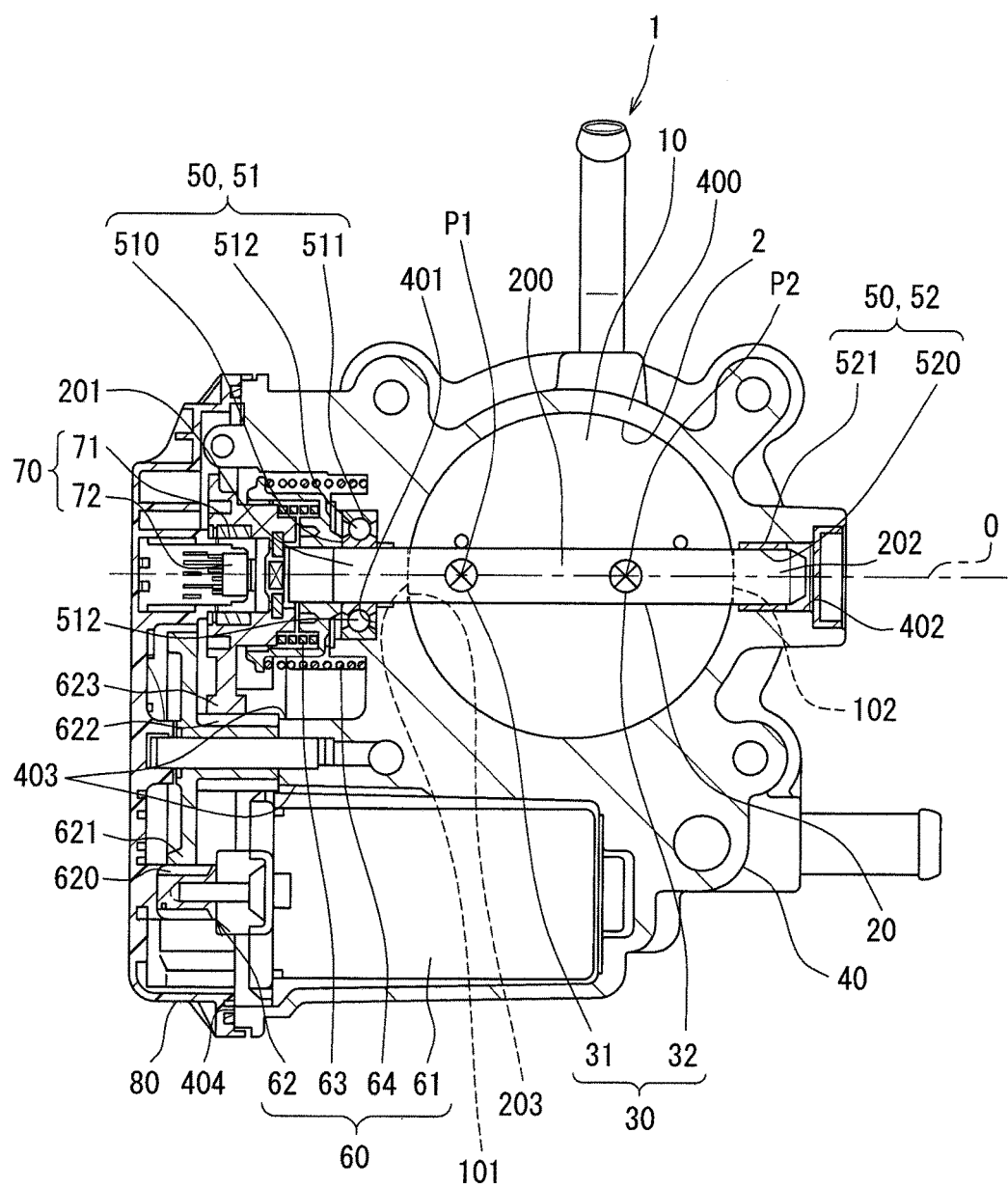
FIG. 3 is a cross-sectional view of the intake air control device according to the first embodiment.

As shown in FIGS. 1 to 3, an intake air control device 1 of a first embodiment is installed to an internal combustion engine of a vehicle. The intake air control device 1 controls a flow of intake air in an intake air passage 2 of the internal combustion engine by opening or closing the intake air passage 2. The intake air control device 1 includes a throttle valve 10, a valve shaft 20, a fixing structure 30, a valve body 40, a bearing structure 50, a drive device 60, a sensor device 70 and a cover member 80.

As shown in FIGS. 1 and 3, the throttle valve 10 is a rotary motion valve of a butterfly type, and the throttle valve 10 is made of a metal material and is shaped into a circular disk plate form. The throttle valve 10 is rotatably received in the intake air passage 2. The throttle valve 10 is rotated about an axis O to open or close the intake air passage 2. An opening degree (an opening cross-sectional area) of the intake air passage 2 is adjusted by the throttle valve 10 in response to a rotational position of the throttle valve 10, and thereby a flow amount of the intake air in the intake air passage 2 is controlled.

The valve shaft 20 is a shaft for rotating the throttle valve 10, and the valve shaft 20 is made of a metal material and is shaped into an elongated round rod form. The valve shaft 20 is placed along the axis O that substantially coincides with a center line of the valve shaft 20. The valve shaft 20 includes a fixing shaft portion 200 and rotatable shaft portions 201, 202. The fixing shaft portion 200 is an exposed portion of the valve shaft 20, which is exposed to the intake air passage 2. As shown in FIG. 3, the fixing shaft portion 200 has a fitting hole 203 that penetrates through the fixing shaft portion 200 in a radial direction of the fixing shaft portion 200. The throttle valve 10 is inserted and fitted in the fitting hole 203 in the radial direction and is integrally rotatably fixed to the fixing shaft portion 200. The rotatable shaft portion 201 and the rotatable shaft portion 202 are joined together in an axial direction of the valve shaft 20 by the fixing shaft portion 200. In the following description, the axial direction and the radial direction of the valve shaft 20 will be simply referred to as an axial direction and a radial direction, respectively.

The first rotatable shaft portion 201 extends from the fixing shaft portion 200 toward one side in the axial direction. With this extending configuration, the first rotatable shaft portion 201 projects from the throttle valve 10 toward the one side in the axial direction, and thereby the first rotatable shaft portion 201 is placed at an outside of the intake air passage 2. The second rotatable shaft portion 202 extends from the fixing shaft portion 200 toward the other side in the axial direction. With this extending configuration, the second rotatable shaft portion 202 projects from the throttle valve 10 toward the other side in the axial direction, and thereby the second rotatable shaft portion 202 is placed at the outside of the intake air passage 2.

As shown in FIGS. 1 and 3, the fixing structure 30 includes a pair of fixing members 31, 32. The fixing members 31, 32 are screw members that cooperate with each other to fix the fixing shaft portion 200 to the throttle valve 10, and the fixing members 31, 32 are made of a metal material and are respectively in a form of a male-threaded screw. Although the fixing members 31, 32 have substantially the identical shape and size in the present embodiment, the fixing members 31, 32 may have different shapes and sizes, respectively.

The first fixing member 31 is provided such that the first fixing member 31 corresponds to a first location P1 of the fixing shaft portion 200 in the axial direction. The first fixing member 31 at the first location P1 is threadably fixed to the fixing shaft portion 200 in a state where the first fixing member 31 extends through the fixing shaft portion 200 and the throttle valve 10 in the radial direction that is perpendicular to the penetrating direction of the fitting hole 203 at the fixing shaft portion 200. In this way, the first fixing member 31 implements the fixing of the fixing shaft portion 200 to the throttle valve 10 at the first location P1.

The second fixing member 32 is provided such that the second fixing member 32 corresponds to a second location P2 of the fixing shaft portion 200 in the axial direction. The second fixing member 32 at the second location P2 is threadably fixed to the fixing shaft portion 200 in a state where the second fixing member 32 extends through the fixing shaft portion 200 and the throttle valve 10 in the radial direction that is perpendicular to the penetrating direction of the fitting hole 203 at the fixing shaft portion 200. In this way, the second fixing member 32 implements the fixing of the fixing shaft portion 200 to the throttle valve 10 at the second location P2.

The valve body 40 is a fixed link that is fixed to the internal combustion engine to form the intake air passage 2, and the valve body 40 is made of a metal material and is shaped into a hollow form. The valve body 40 forms a bore portion 400 in a cylindrical tubular form while the bore portion 400 forms the intake air passage 2 therein and receives the throttle valve 10. The bore portion 400 can close the intake air passage 2 when the bore portion 400 is fitted to an outer peripheral portion of the throttle valve 10 along an entire circumferential extent of the outer peripheral portion of the throttle valve 10 in a state where the throttle valve 10 is rotated to a full closing position (see FIGS. 1 and 3). In this way, at the full closing position of the throttle valve 10, the flow amount of the intake air in the intake air passage 2 is limited to an inevitable flow amount of the intake air that inevitably flows through a minute full closing state clearance formed between the bore portion 400 of the valve body 40 and the throttle valve 10. Furthermore, although not depicted in the drawings, the bore portion 400 can open the intake air passage 2 by forming an opening between the bore portion 400 and a corresponding section of the outer peripheral portion of the throttle valve 10, which are other than rim sections 101, 102 (see FIG. 3) of the outer peripheral portion of the throttle valve 10 after rotating the throttle valve 10 from the full closing position.

As shown in FIG. 3, the valve body 40 forms holding spaces 401, 402, each of which is in a form of a cylindrical hole, at two opposite sides, respectively, of the intake air passage 2, which are opposite to each other in the axial direction. The first rotatable shaft portion 201 is coaxially inserted into the first holding space 401, and the second rotatable shaft portion 202 is coaxially inserted into the second holding space 402. Furthermore, the valve body 40 forms a receiving space 403, which is communicated with the first holding space 401 at an opposite side, which is opposite from the throttle valve 10 and the intake air passage 2 in the axial direction.

The bearing structure 50 includes a pair of bearings 51, 52. The first bearing 51 is coaxially received in the first holding space 401 and is held by the valve body 40 along the axis O. The second bearing 52 is coaxially received in the second holding space 402 and is held by the valve body 40 along the axis O.

The first bearing 51 is a radial rolling-element bearing made of a metal material and is formed such that a plurality of spherical rolling elements 512 are interposed between an inner race 510 and an outer race 511. In the first bearing 51 of the present embodiment, the rolling elements 512 are arranged in a single row between the inner race 510 and the outer race 511. Alternatively, the rolling elements 512 may be arranged in a plurality of rows between the inner race 510 and the outer race 511. The inner race 510, which is shaped into a circular ring form, is securely fitted to an outer peripheral portion of the first rotatable shaft portion 201. The outer race 511, which is shaped into a circular ring form, is securely fitted to an inner peripheral portion of the valve body 40. The rolling elements 512 are arranged one after another at equal intervals in a common circumferential direction, which is common to the inner race 510 and the outer race 511, and the rolling elements 512 are in rolling contact with the inner race 510 and the outer race 511. With the above construction, the first bearing 51 rotatably supports the first rotatable shaft portion 201.

The second bearing 52 is a radial plain bearing made of a metal material, and the second bearing 52 is shaped into a cylindrical tubular form as a whole. An inner peripheral portion of the second bearing 52 is axially slidably fitted to an outer peripheral portion of the second rotatable shaft portion 202 to form a slidable portion 520. An outer peripheral portion of the second bearing 52 is securely fitted to an inner peripheral portion of the valve body 40 to form a fixing portion 521. With the above construction, the second bearing 52 rotatably supports the second rotatable shaft portion 202.

The drive device 60 includes an electric motor 61, a speed reducing mechanism 62 and springs 63, 64 and is received in an inside of the receiving space 403. When an electric power is supplied from an external control circuit to the electric motor 61, the electric motor 61 outputs a rotational torque from a motor shaft 610. The speed reducing mechanism 62 includes a plurality of gears 620, 621, 622, 623, which are made of metal and are meshed one after another. The speed reducing mechanism 62 reduces a speed of the rotation between the initial stage gear 620, which is rotated integrally with the motor shaft 610, and the final stage gear 623, which is rotated integrally with the first rotatable shaft portion 201 of the valve shaft 20. By this speed reduction, the speed reducing mechanism 62 amplifies a rotational torque, which is outputted from the motor shaft 610, and the speed reducing mechanism 62 transmits the amplified rotational torque to the first rotatable shaft portion 201 to adjust the opening degree of the throttle valve 10 according to the rotational position of the valve shaft 20. The default spring 63 exerts an urging torque, which urges the throttle valve 10 from the full closing position to the full opening position, against the first rotatable shaft portion 201. The return spring 64 exerts an urging torque, which urges the throttle valve 10 from the full opening position to the full closing position, against the first rotatable shaft portion 201. Because of the urging torques of the springs 63, 64, which are exerted in opposite directions, respectively, the rotational position of the throttle valve 10 is held in an intermediate position between the full closing position and the full opening position at the time of stopping the supply of the electric power to the electric motor 61.

The sensor device 70 includes a rotor magnet 71 and a sensor element 72 and is received in the receiving space 403. The rotor magnet 71 is a permanent magnet made of metal and is installed to an inner peripheral portion of the final stage gear 623 in a manner that enables integral rotation of the rotor magnet 71 with the final stage gear 623. The sensor element 72 is a magneto-electric conversion element, such as a Hall element, which outputs a measurement signal after sensing a magnetic field generated by the rotor magnet 71. The sensor element 72 is placed on a radially inner side of the rotor magnet 71 and is secured in position by the cover member 80. The measurement signal, which is outputted from the sensor element 72, indicates a rotational position of the valve shaft 20, which is rotated integrally with the final stage gear 623. Therefore, the external control circuit can sense the opening degree of the throttle valve 10, which corresponds to the rotational position of the valve shaft 20.

The cover member 80 is a cover that covers the receiving space 403, and the cover member 80 is made of a resin material and is shaped into a cup form. The cover member 80 is installed to an opening 404 of the valve body 40, at which the receiving space 403 opens, so that the cover member 80 protects the drive device 60 and the sensor device 70 received in the receiving space 403.

(Relationship of Linear Expansion Coefficients)

Figures 4, 5:
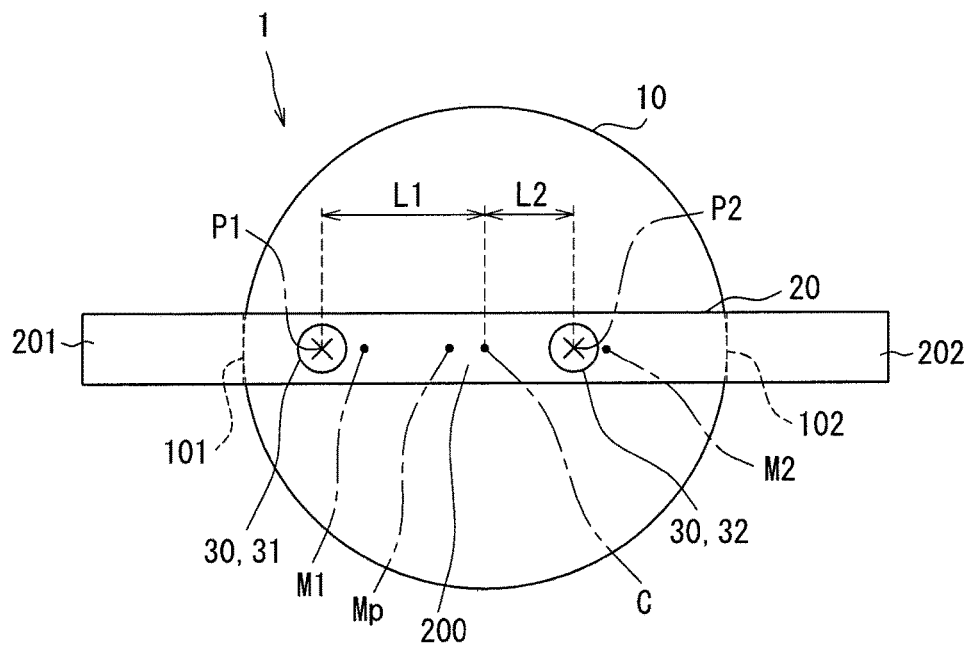
FIG. 4 is a characteristic table for describing a relationship of various linear expansion coefficients at the intake air control device of the first embodiment.
FIG. 5 is a schematic view that corresponds to FIG. 3 and is for describing a relationship of fixing locations at the intake air control device of the first embodiment.

With reference to FIG. 4, a relationship of linear expansion coefficients of the specific elements of the intake air control device 1 will be described.

The valve shaft 20 is made of the metal material, such as iron-based material (e.g., stainless steel), which implements a predetermined linear expansion coefficient $\alpha a$ in the axial direction. In contrast, the valve body 40 is made of the metal material, such as aluminum-based material (e.g., an aluminum alloy), that implements a linear expansion coefficient $\alpha b$, which is larger than the linear expansion coefficient $\alpha a$ of the valve shaft 20, in the axial direction. Furthermore, the throttle valve 10 is made of the metal material, such as aluminum-based material (e.g., an aluminum alloy), that implements a linear expansion coefficient $\alpha c$, which is larger than the linear expansion coefficient $\alpha a$ of the valve shaft 20 and the linear expansion coefficient $\alpha b$ of the valve body 40, in the axial direction.

By forming the valve shaft 20, the valve body 40 and the throttle valve 10 from the above-described metal materials, respectively, the linear expansion coefficient $\alpha c$ of the throttle valve 10 and the linear expansion coefficient $\alpha b$ of the valve body 40 are set to be larger than the linear expansion coefficient $\alpha a$ of the valve shaft 20 in the axial direction of the intake air control device 1. Furthermore, the linear expansion coefficient $\alpha c$ of the throttle valve 10 is set to be larger than the linear expansion coefficient $\alpha b$ of the valve body 40 in the axial direction of the intake air control device 1

(Relationship of Fixing Locations)

With reference to FIG. 5, a relationship of the locations P1, P2, at which the fixing shaft portion 200 of the valve shaft 20 is fixed to the throttle valve 10, will be described. In the following description, an intersection point between a center line of the first fixing member 31 of the fixing structure 30 and the axis O is defined as the first location P1, and an intersection point between a central line of the second fixing member 32 of the fixing structure 30 and the axis O is defined as the second location P2. Furthermore, the rim section of the throttle valve 10, which is located on the first rotatable shaft portion 201 side in the axial direction, is defined as a first rim section 101, and the rim section of the throttle valve 10, which is located on the second rotatable shaft portion 202 side in the axial direction, is defined as a second rim section 102. Furthermore, a midpoint between the first rim section 101 and the second rim section 102 at the throttle valve 10 is defined as an axial center point C of the throttle valve 10, which is centered in the axial direction.

The first location P1 is located on the first rotatable shaft portion 201 side of the center point C of the throttle valve 10 in the axial direction. Here, particularly noted that the first location P1 is located on the first rotatable shaft portion 201 side of a midpoint M1 between the center point C and the first rim section 101 in the axial direction. In contrast, the second location P2 is located on the second rotatable shaft portion 202 side of the center point C of the throttle valve 10 in the axial direction, so that the second location P2 is spaced from the first location P1 on the second rotatable shaft portion 202 side. Here, particularly noted that the second location P2 is located on the center point C side (i.e., the first rotatable shaft portion 201 side) of a midpoint M2 between the center point C and the second rim section 102 in the axial direction.

Because of the above construction, a first distance L1, which is measured from the center point C of the throttle valve 10 to the first location P1 in the axial direction of the intake air control device 1, is set to be larger than a second distance L2, which is measured from the center point C of the throttle valve 10 to the second location P2 in the axial direction of the intake air control device 1. Thereby, a midpoint Mp between the first location P1 and the second location P2 is displaced from the center point C of the throttle valve 10 toward the first rotatable shaft portion 201 in the axial direction.

(Effects and Advantages)

Hereinafter, effects and advantages of the first embodiment will be described.

As discussed above, in the first embodiment, the linear expansion coefficient $\alpha c$ of the throttle valve 10 and the linear expansion coefficient $\alpha b$ of the valve body 40 are set to be larger than the linear expansion coefficient $\alpha a$ of the valve shaft 20 in the axial direction. Therefore, in order to limit an interference between the throttle valve 10 and the valve body 40, it is necessary to consider a thermal deformation amount difference, which corresponds to a linear expansion coefficient difference $\alpha c$-$\alpha b$ between the throttle valve 10 and the valve shaft 20, and a thermal deformation amount difference, which corresponds to a linear expansion coefficient difference $\alpha b$-$\alpha a$ between the valve body 40 and the valve shaft 20.

Specifically, in the first embodiment, the first rotatable shaft portion 201 of the valve shaft 20 is fixed to the inner race 510 of the first bearing 51 that has the outer race 511 fixed to the valve body 40, so that the first rotatable shaft portion 201 is rotatably supported by the first bearing 51. Therefore, in order to limit the interference between the throttle valve 10 and the valve body 40 by ensuring the full closing state clearance on the first rotatable shaft portion 201, a sum of a thermal expansion amount difference (i.e., a difference in a thermal expansion amount) between the throttle valve 10 and the valve shaft 20 and a thermal expansion amount difference between the valve body 40 and the valve shaft 20 needs to be made small at the high temperature.

Furthermore, in the first embodiment, the second rotatable shaft portion 202 of the valve shaft 20 is axially slidably fitted to the slidable portion 520 of the second bearing 52 that has the fixing portion 521 fixed to the valve body 40, so that the second rotatable shaft portion 202 is rotatably supported by the second bearing 52. Therefore, in order to limit the interference between the throttle valve 10 and the valve body 40 by ensuring the full closing state clearance on the second rotatable shaft portion 202 side, a thermal contraction amount difference (i.e., a difference in a thermal contraction amount) between the throttle valve 10 and the valve shaft 20 needs to be larger than a thermal contraction amount difference between the valve body 40 and the valve shaft 20 at the low temperature.

The fixing shaft portion 200 of the valve shaft 20 of the first embodiment is fixed to the throttle valve 10 by the first fixing member 31 at the first location P1 that is located on the first rotatable shaft portion 201 side of the axial center point C of the throttle valve 10. Also, the fixing shaft portion 200 of the valve shaft 20 of the first embodiment is fixed to the throttle valve 10 by the second fixing member 32 at the second location P2 that is located on the second rotatable shaft portion 202 side of the axial center point C of the throttle valve 10. In the above-described fixing structure, the first distance L1, which is measured from the center point C of the throttle valve 10 to the first location P1 in the axial direction, is set to be larger than the second distance L2, which is measured from the center point C of the throttle valve 10 to the second location P2 in the axial direction, based on the above-described finding about the thermal expansion amount difference and the thermal contraction amount difference.

Figure 6:
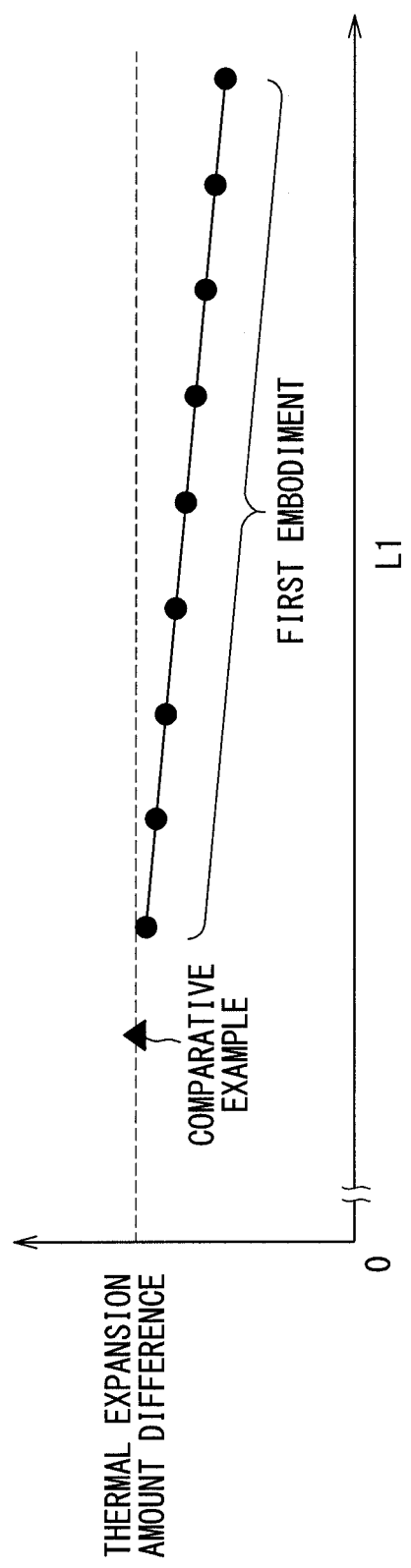
FIG. 6 is a graph for describing effects and advantages of the intake air control device of the first embodiment.

With the above-described settings of the distances L1, L2, the first location P1, at which the first distance L1 measured from the center point C to the first location P1 is set to be relatively large, is relatively close to the first rim section 101 located on the first rotatable shaft portion 201 side. Therefore, an axial distance, which is measured from the first location P1 to the first rim section 101, becomes relatively small, and thereby the thermal expansion amount difference between the throttle valve 10 and the valve shaft 20 can be reduced in this range, which is from the first location P1 to the first rim section 101, at the high temperature, as shown in FIG. 6. Thus, at the first rotatable shaft portion 201 side, the sum of the thermal expansion amount difference between the throttle valve 10 and the valve shaft 20 and the thermal expansion amount difference between the valve body 40 and the valve shaft 20 can be reduced, and thereby the interference between the throttle valve 10 and the valve body 40 can be limited by ensuring the full closing state clearance. In FIG. 6, black circles indicate that the thermal expansion amount difference between the throttle valve 10 and the valve shaft 20 is progressively reduced in a case where the first distance L1 is progressively increased within a range that is larger than the second distance L2 under a condition of that the sum of the distances L1, L2 is kept to be a constant value at the temperature of 140 degrees Celsius, which serves as the high temperature. Also, in FIG. 6, a black triangle indicates a thermal expansion amount difference between the throttle valve 10 and the valve shaft 20 in a case where the first distance L1 and the second distance L2 are set to be equal to each other under the condition of that the sum of the distances L1, L2 is kept to be the constant value described above at the temperature of 140 degrees Celsius, which serves as the high temperature.

Here, it should be particularly noted that at the first rotatable shaft portion 201 side of the present embodiment, with respect to a thermal expansion amount difference between the throttle valve 10 and the valve shaft 20 at an assumed highest temperature and a thermal expansion amount difference between the valve body 40 and the valve shaft 20 at the assumed highest temperature, a sum of these thermal expansion amount differences is set to be smaller than the full closing state clearance at the normal temperature. With this setting, it is possible to ensure that the full closing state clearance at any operating temperature from the assumed highest temperature to the assumed lowest temperature is equal to or larger than a required minimum width (a required minimum size) that is required for the opening and closing operation of the throttle valve 10. Here, the assumed highest temperature is, for example, 140 degrees Celsius, and the assumed lowest temperature is, for example, −40 degrees Celsius.

Furthermore, according to the above settings of the distances L1, L2, the second location P2, at which the second distance L2 measured from the center point C of the throttle valve 10 to the second location P2 is relatively small, is relatively far from the second rim section 102 located on the second rotatable shaft portion 202 side. Therefore, the axial distance, which is measured from the second location P2 to the second rim section 102, becomes relatively large, and thereby the thermal contraction amount difference between the throttle valve 10 and the valve shaft 20 can be increased in this range, which is from the second location P2 to the second rim section 102, at the low temperature. Thus, at the second rotatable shaft portion 202 side, the thermal contraction amount difference between the throttle valve 10 and the valve shaft 20 at the low temperature can be increased in comparison to the thermal contraction amount difference between the valve body 40 and the valve shaft 20 at the low temperature, and thereby the interference between the throttle valve 10 and the valve body 40 can be limited by ensuring the full closing state clearance.

Here, it should be particularly noted that at the second rotatable shaft portion 202 side of the present embodiment, the thermal contraction amount difference between the throttle valve 10 and the valve shaft 20 at the assumed lowest temperature is set to be larger than the thermal contraction amount difference between the valve body 40 and the valve shaft 20 at the assumed lowest temperature. With this setting, it is possible to ensure that the full closing state clearance at any operating temperature from the assumed lowest temperature to the assumed highest temperature is equal to or larger than the required minimum width that is required for the opening and closing operation of the throttle valve 10.

According to the first embodiment discussed above, it is possible to limit the flow of the intake air through the intake air passage at the full closing time of the throttle valve 10 beyond the inevitable flow amount of the intake air that inevitably flows through the full closing state clearance that is set to limit the interference between the throttle valve 10 and the valve body 40. Therefore, it is possible to ensure the characteristics as of the intake air control device 1.

In addition, in the first embodiment, the linear expansion coefficient αc of the throttle valve 10 is set to be larger than the linear expansion coefficient αb of the valve body 40 in the axial direction, so that the thermal expansion amount difference between the throttle valve 10 and the valve shaft 20 can easily become larger than the thermal expansion amount difference between the valve body 40 and the valve shaft 20. However, at the throttle valve 10, the axial distance, which is measured from the first location P1 to the first rim section 101, becomes relatively small according to the settings of the distances L1, L2, so that the thermal expansion amount difference between the throttle valve 10 and the valve shaft 20 can be minimized in this range, which is from the first location P1 to the first rim section 101, at the high temperature. In this way, at the first rotatable shaft portion 201 side, with respect to the thermal expansion amount difference between the valve body 40 and the valve shaft 20 and the thermal expansion amount difference between the throttle valve 10 and the valve shaft 20 (while the thermal expansion amount difference between the throttle valve 10 and the valve shaft 20 can easily become larger that the thermal expansion amount difference between the valve body 40 and the valve shaft 20), the sum of these thermal expansion amount differences can be reduced at the high temperature, and thereby the interference between the throttle valve 10 and the valve body 40 can be limited.

In addition, at the throttle valve 10 of the first embodiment, the first location P1 is located on the first rotatable shaft portion 201 side of the midpoint M1 between the center point C and the first rim section 101. In this way, the first location P1 is placed closer to the first rim section 101 located on the first rotatable shaft portion 201 in comparison to the midpoint M1, and thereby the thermal expansion amount difference between the throttle valve 10 and the valve shaft 20 can be reliably reduced at the high temperature in the axial range, which is from the first location P1 to the first rim section 101. In this way, at the first rotatable shaft portion 201 side, the sum of the thermal expansion amount difference between the throttle valve 10 and the valve shaft 20 and the thermal expansion amount difference between the valve body 40 and the valve shaft 20 can be also reliably reduced at the high temperature, and thereby the interference between the throttle valve 10 and the valve body 40 can be limited. Thereby, it is possible to increase the reliability with respect to the ensuring of the characteristics as of the intake air control device 1.

Furthermore, at the throttle valve 10 of the first embodiment, the second location P2 is located on the center point C side of the midpoint M2 between the center point C and the second rim section 102. In this way, the second location P2 is placed farther from the second rim section 102 located on the second rotatable shaft portion 202 side in comparison to the midpoint M2, and thereby the thermal contraction amount difference between the throttle valve 10 and the valve shaft 20 can be reliably increased at the low temperature in the axial range, which is from the second location P2 to the second rim section 102. Thus, at the second rotatable shaft portion 202 side, the thermal contraction amount difference between the throttle valve 10 and the valve shaft 20 at the low temperature can be reliably increased in comparison to the thermal contraction amount difference between the valve body 40 and the valve shaft 20 at the low temperature, and thereby the interference between the throttle valve 10 and the valve body 40 can be limited. Thereby, it is possible to increase the reliability with respect to the ensuring of the characteristics as of the intake air control device 1.

(Second Embodiment)

Figure 7:
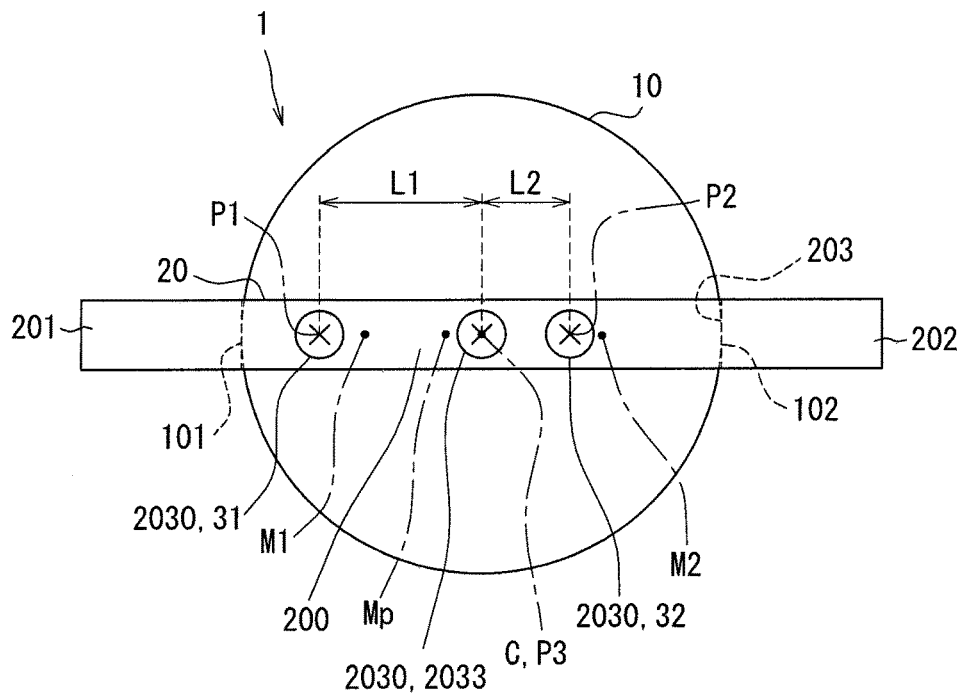
FIG. 7 is a schematic view that corresponds to FIG. 5 and is for describing a relationship of fixing locations at the intake air control device of a second embodiment.

As shown in FIG. 7, a second embodiment of the present disclosure is a modification of the first embodiment. A fixing structure 2030 of the second embodiment is formed by combining an additional third fixing member 2033 with the first fixing member 31 and the second fixing member 32 discussed in the first embodiment.

The third fixing member 2033 is a screw member that cooperates with the first fixing member 31 and the second fixing member 32 to fix the fixing shaft portion 200 to the throttle valve 10, and the third fixing member 2033 is made of the metal material and is in a form of a male-threaded screw. Although the third fixing member 2033 has substantially the identical shape and size as those of the first fixing member 31 and the second fixing member 32, the third fixing member 2033 may have different shape and size that are different from the shape and size of the first fixing member 31 and the second fixing member 32.

The third fixing member 2033 is provided such that the third fixing member 2033 corresponds to a third location P3 of the fixing shaft portion 200 in the axial direction. The third fixing member 2033 at the third location P3 is threadably fixed to the fixing shaft portion 200 in a state where the third fixing member 2033 extends through the fixing shaft portion 200 and the throttle valve 10 in the radial direction that is perpendicular to the penetrating direction of the fitting hole 203 at the fixing shaft portion 200. In this way, the third fixing member 2033 implements the fixing of the fixing shaft portion 200 to the throttle valve 10 at the third location P3. Here, the third location P3, which is defined at an intersection point between the center line of the third fixing member 2033 and the axis O, is located between the first location P1 and the second location P2 in the axial direction. Particularly, the third location P3 of the present embodiment substantially coincides with the center point C of the throttle valve 10.

With the third fixing member 2033 of the second embodiment, the fixing shaft portion 200 is fixed to the throttle valve 10 at the third location P3 between the first location P1 and the second location P2. Thereby, the first location P1 is relatively close to the first rim section 101 of the throttle valve 10, and the second location P2 is relatively far from the second rim section 102 of the throttle valve 10. At the same time, the fixation strength of the fixing shaft portion 200 relative to the throttle valve 10 is increased, and thereby this fixing structure can be maintained. Thus, it is possible to maintain the reliability with respect to the ensuring of the characteristics as of the intake air control device 1 for a relatively long period of time.

(Other Embodiments)

Although the present disclosure has been described in view of the above embodiments, the present disclosure is not necessarily limited to these embodiments and may be applied to various other embodiments and combinations of the embodiments.

In a first modification with respect to the first and second embodiments, another member, such as a rivet(s), may be used as the fixing members 31, 32 in addition to or alternative to the screw member. In a second modification with respect to the first and second embodiments, the linear expansion coefficient αc of the throttle valve 10 may be set to be equal to or smaller than the linear expansion coefficient αb of the valve body 40. With respect to the second modification, the linear expansion coefficient αc, which is smaller than the linear expansion coefficient αb, can be implemented by forming the throttle valve 10 from, for example, a copper-based material, such as brass, and forming the valve body 40 from, for example, an aluminum-based material, such as an aluminum alloy.

Figure 8:
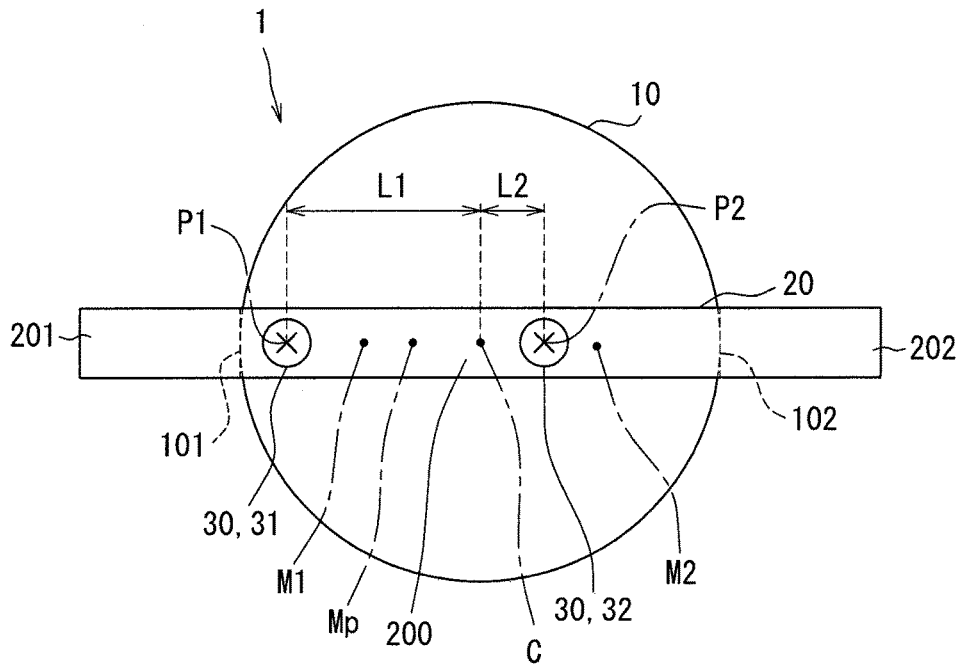
FIG. 8 is a schematic view showing a modification of FIG. 5.

In a third modification with respect to the first and second embodiments, according to the graph of FIG. 6, as shown in FIG. 8, as long as the first distance L1 is larger than the second distance L2, the first location P1 may be placed closer to the first rim section 101 in comparison to FIGS. 5 and 7, and the second location P2 may be spaced farther from the second rim section 102 in comparison to the FIGS. 5 and 7. FIG. 8 shows the third modification of the first embodiment.

Figure 9:
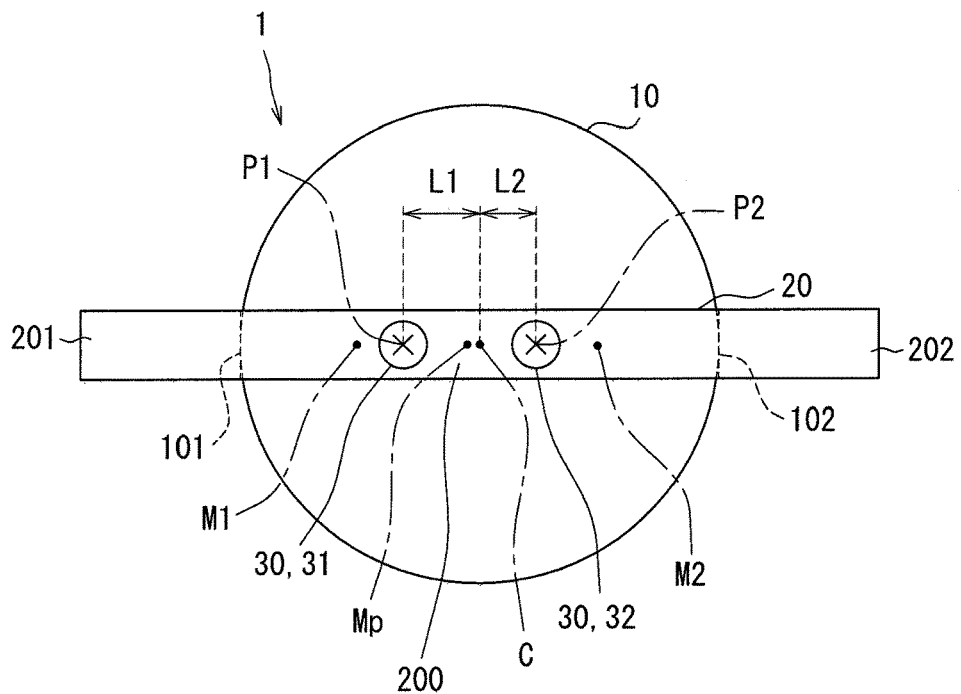
FIG. 9 is a schematic view showing another modification of FIG. 5.

In a fourth modification with respect to the first and second embodiments, as shown in FIG. 9, as long as the first distance L1 is larger than the second distance L2, the first location P1 may be placed on the center point C side (specifically, the second rotatable shaft portion 202 side) of the midpoint M1 between the center point C and the first rim section 101. FIG. 9 shows the fourth modification of the first embodiment.

Figure 10:
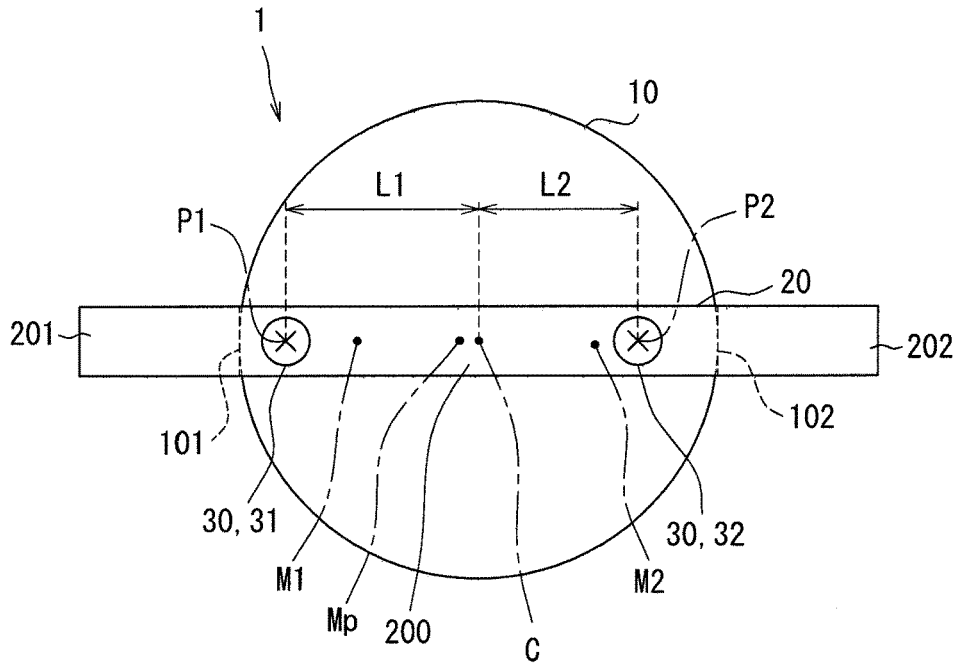
FIG. 10 is a schematic view showing a further modification of FIG. 5.

In a fifth modification with respect to the first and second embodiments, as shown in FIG. 10, as long as the first distance L1 is larger than the second distance L2, the second location P2 may be placed on the second rotatable shaft portion 202 side of the midpoint M2 between the center point C and the second rim section 102. FIG. 10 shows the fifth modification of the first embodiment.

Figure 11:
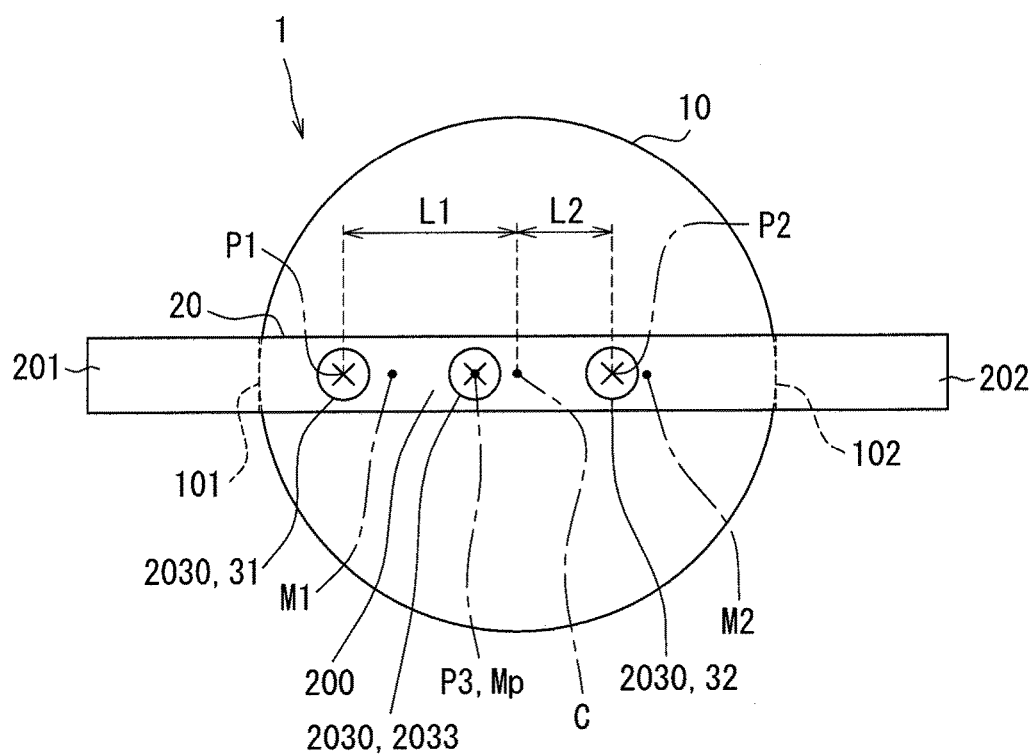
FIG. 11 is a schematic view showing a modification of FIG. 7.

In a sixth modification with respect to the second embodiment, as shown in FIG. 11, the third location P3 may coincide with the midpoint Mp between the first location P1 and the second location P2 as long as the third location P3 is located between the first location P1 and the second location P2. In a seventh modification with respect to the second embodiment, the third location P3 may be set to a location that is different from the center point C of the second embodiment and the midpoint Mp of the sixth modification.

In an eighth modification with respect to the first and second embodiments, a radial rolling-element bearing, in which a plurality of roller-shaped rolling elements is placed in a single row or a plurality of rows between the inner race 510 and the outer race 511, may be used as the first bearing. In a ninth modification with respect to the first and second embodiments, a radial rolling-element bearing, which includes an inner race (serving as a slidable portion) axially slidably fitted to the second rotatable shaft portion 202 and an outer race (serving as a fixing portion) fixed to the valve body 40, may be used as the second bearing.

In a tenth modification with respect to the first and second embodiments, the rotational position of the throttle valve 10 at the time of stopping the supply of the electric power to the electric motor 61 may be held at the full closing position by eliminating the default spring 63. In an eleventh modification with respect to the first and second embodiments, the rotational position of the throttle valve 10 at the time of stopping the supply of the electric power to the electric motor 61 may be held at the full opening position by eliminating the return spring 64.

The invention claimed is:

1. An intake air control device that controls a flow of intake air in an intake air passage of an internal combustion engine, the intake air control device comprising:
   a throttle valve that opens and closes the intake air passage through rotation of the throttle valve;
   a valve shaft that includes:
      a first rotatable shaft portion and a second rotatable shaft portion, which project from one side and another side, respectively, of the throttle valve in an axial direction; and
      a fixing shaft portion that joins between the first rotatable shaft portion and the second rotatable shaft portion in the axial direction, wherein the fixing shaft portion is integrally rotatably fixed to the throttle valve;
   a first fixing member that fixes the fixing shaft portion to the throttle valve at a first location, which is located on one side of a center point of the throttle valve where the first rotatable shaft portion is placed in the axial direction;
   a second fixing member that fixes the fixing shaft portion to the throttle valve at a second location, which is located on another side of the center point of the throttle valve where the second rotatable shaft portion is placed in the axial direction;
   a valve body that forms the intake air passage, which receives the throttle valve;
   a first bearing that is held by the valve body and rotatably supports the first rotatable shaft portion; and
   a second bearing that is held by the valve body and rotatably supports the second rotatable shaft portion, wherein:
   the first bearing includes an inner race, which is fixed to the first rotatable shaft portion, and an outer race, which is fixed to the valve body;
   the second bearing includes a slidable portion, which is axially slidably fitted to the second rotatable shaft portion, and a fixing portion, which is fixed to the valve body;
   a linear expansion coefficient of the throttle valve and a linear expansion coefficient the valve body are set to be larger than a linear expansion coefficient of the valve shaft in the axial direction; and
   a first distance, which is measured from the center point to the first location in the axial direction, is set to be larger than a second distance, which is measured from the center point to the second location in the axial direction.

2. The intake air control device according to claim 1, wherein the linear expansion coefficient of the throttle valve is set to be larger than the linear expansion coefficient of the valve body in the axial direction.

3. The intake air control device according to claim 1, wherein:
   the throttle valve includes a first rim section on the one side of the throttle valve where the first rotatable shaft portion is placed in the axial direction; and
   the first location is located on a side of a midpoint between the center point and the first rim section where the first rotatable shaft portion is placed.

4. The intake air control device according to claim 1, wherein:
   the throttle valve includes a second rim section on the another side of the throttle valve where the second rotatable shaft portion is placed in the axial direction; and
   the second location is located on a side of a middle portion between the center point and the second rim section where the center point is placed.

5. The intake air control device according to claim 1, comprising a third fixing member that fixes the fixing shaft portion to the throttle valve at a third location, which is located between the first location and the second location.

* * * * *